(12) United States Patent
Huang et al.

(10) Patent No.: US 9,871,452 B2
(45) Date of Patent: Jan. 16, 2018

(54) TRANSFORMER, FLYBACK CONVERTER AND SWITCHING POWER SUPPLY WITH THE SAME

(71) Applicant: Silergy Semiconductor Technology (Hangzhou) LTD, Hangzhou, ZheJiang Province (CN)

(72) Inventors: Qiukai Huang, Hangzhou (CN); Xinlei Li, Hangzhou (CN); Zhiliang Hu, Hangzhou (CN); Chaopeng Jin, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 15/224,745

(22) Filed: Aug. 1, 2016

(65) Prior Publication Data
US 2017/0047848 A1 Feb. 16, 2017

(30) Foreign Application Priority Data

Aug. 12, 2015 (CN) .......................... 2015 1 0493392

(51) Int. Cl.
*H02M 3/335* (2006.01)
*H02M 1/44* (2007.01)
*H01F 38/42* (2006.01)

(52) U.S. Cl.
CPC ........ *H02M 3/33507* (2013.01); *H01F 38/42* (2013.01); *H02M 1/44* (2013.01)

(58) Field of Classification Search
CPC ............... H02M 1/44; H02M 3/33507; H02M 2001/0006
See application file for complete search history.

(56) References Cited

U.S. PATENT DOCUMENTS

| 8,917,068 | B2 | 12/2014 | Chen et al. | |
|---|---|---|---|---|
| 2004/0022075 | A1* | 2/2004 | Perry | H02M 3/33592 363/21.01 |
| 2004/0246749 | A1* | 12/2004 | Odell | H01F 27/34 363/21.12 |
| 2004/0251999 | A1* | 12/2004 | Darmann | H01F 6/06 336/180 |
| 2005/0207180 | A1* | 9/2005 | Pansier | H02M 3/337 363/16 |

(Continued)

*Primary Examiner* — Yusef Ahmed
(74) *Attorney, Agent, or Firm* — Michael C. Stephens, Jr.

(57) ABSTRACT

A flyback converter can include: a power switch controlled to be turned on/off to control a current through a primary side; a first primary winding coupled between an input terminal and a first terminal of the power switch, where a dotted terminal of the first primary winding is coupled to a first terminal of the power switch; a second primary winding coupled between a second terminal of the power switch and a primary grounding terminal, where a dotted terminal of the second primary winding is coupled to the primary grounding terminal; a secondary winding configured between the first and second primary windings in a radial direction of a magnetic core, where the first primary winding, the second primary winding, and the secondary winding are wound around the magnetic core; and a secondary rectifier and filter circuit coupled with the secondary winding, and configured to generate a stable current/voltage.

8 Claims, 9 Drawing Sheets

(56) References Cited

U.S. PATENT DOCUMENTS

| | | | |
|---|---|---|---|
| 2005/0219865 A1* | 10/2005 | Vogman | H02M 3/33569 363/16 |
| 2005/0226008 A1* | 10/2005 | Harada | H02M 3/3353 363/15 |
| 2006/0044844 A1* | 3/2006 | Utsuno | H01F 27/38 363/21.01 |
| 2007/0075700 A1* | 4/2007 | Nakahori | H02M 3/335 323/355 |
| 2007/0159143 A1* | 7/2007 | Yang | H02M 3/33523 323/247 |
| 2007/0159856 A1* | 7/2007 | Yang | H02M 1/44 363/21.12 |
| 2008/0019156 A1* | 1/2008 | Lanni | H02M 1/143 363/40 |
| 2008/0309445 A1* | 12/2008 | Suzuki | H01F 41/069 336/183 |
| 2009/0212754 A1* | 8/2009 | Ryan | H02M 1/14 323/282 |
| 2009/0289751 A1* | 11/2009 | Nagano | H01F 3/10 336/221 |
| 2009/0316439 A1* | 12/2009 | Utsuno | H01F 30/06 363/16 |
| 2010/0060255 A1* | 3/2010 | Ouyang | H01F 27/2885 323/355 |
| 2010/0321958 A1* | 12/2010 | Brinlee | H02M 3/28 363/21.1 |
| 2011/0074533 A1* | 3/2011 | Phadke | H01F 27/2866 336/150 |
| 2011/0103100 A1* | 5/2011 | Hosotani | H01F 3/10 363/21.02 |
| 2011/0157945 A1* | 6/2011 | Malinin | H01F 27/40 363/127 |
| 2013/0188329 A1* | 7/2013 | Chang | H05K 1/18 361/836 |
| 2013/0301309 A1 | 11/2013 | Chen | |
| 2014/0185337 A1* | 7/2014 | Espino | H01F 27/362 363/21.17 |
| 2014/0327511 A1* | 11/2014 | Tsai | H01F 27/28 336/220 |
| 2014/0334198 A1* | 11/2014 | Yang | H01F 27/362 363/21.12 |
| 2015/0092451 A1* | 4/2015 | Popovici | H02M 3/28 363/17 |
| 2015/0280578 A1 | 10/2015 | Huang et al. | |
| 2016/0020700 A1 | 1/2016 | Zhang et al. | |
| 2016/0181008 A1* | 6/2016 | de Groot | H01F 27/385 363/127 |

* cited by examiner

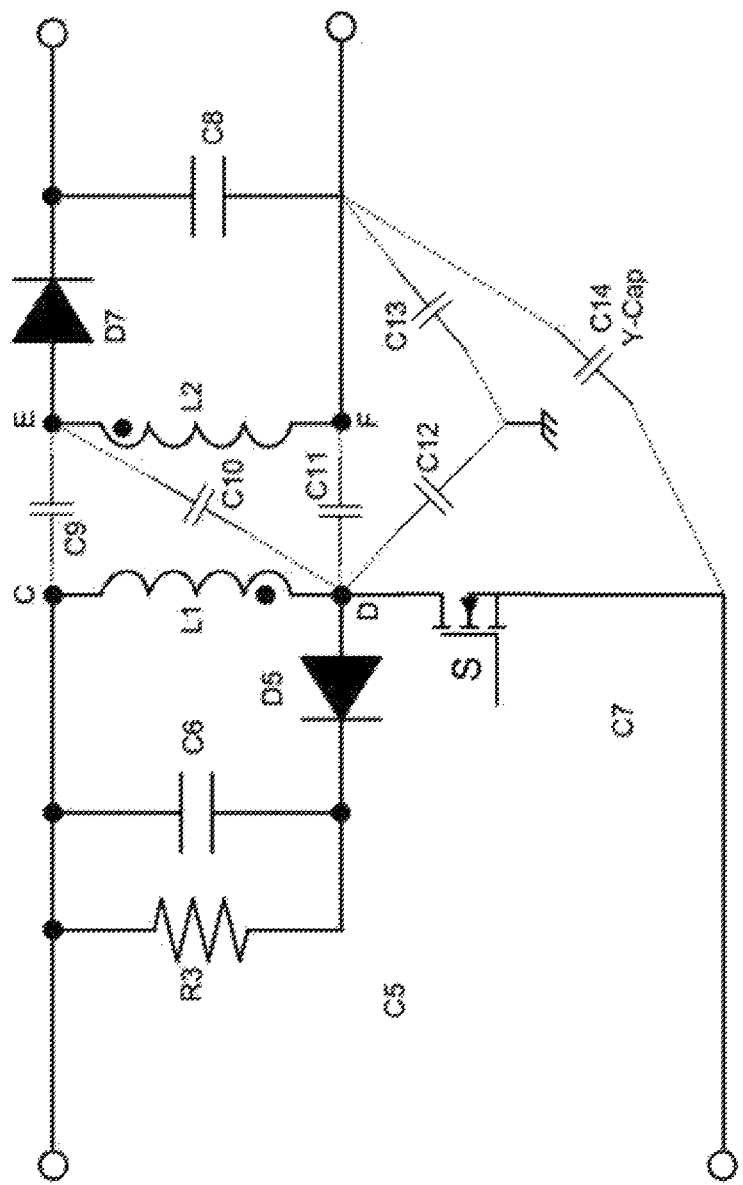
FIG. 1 (conventional)

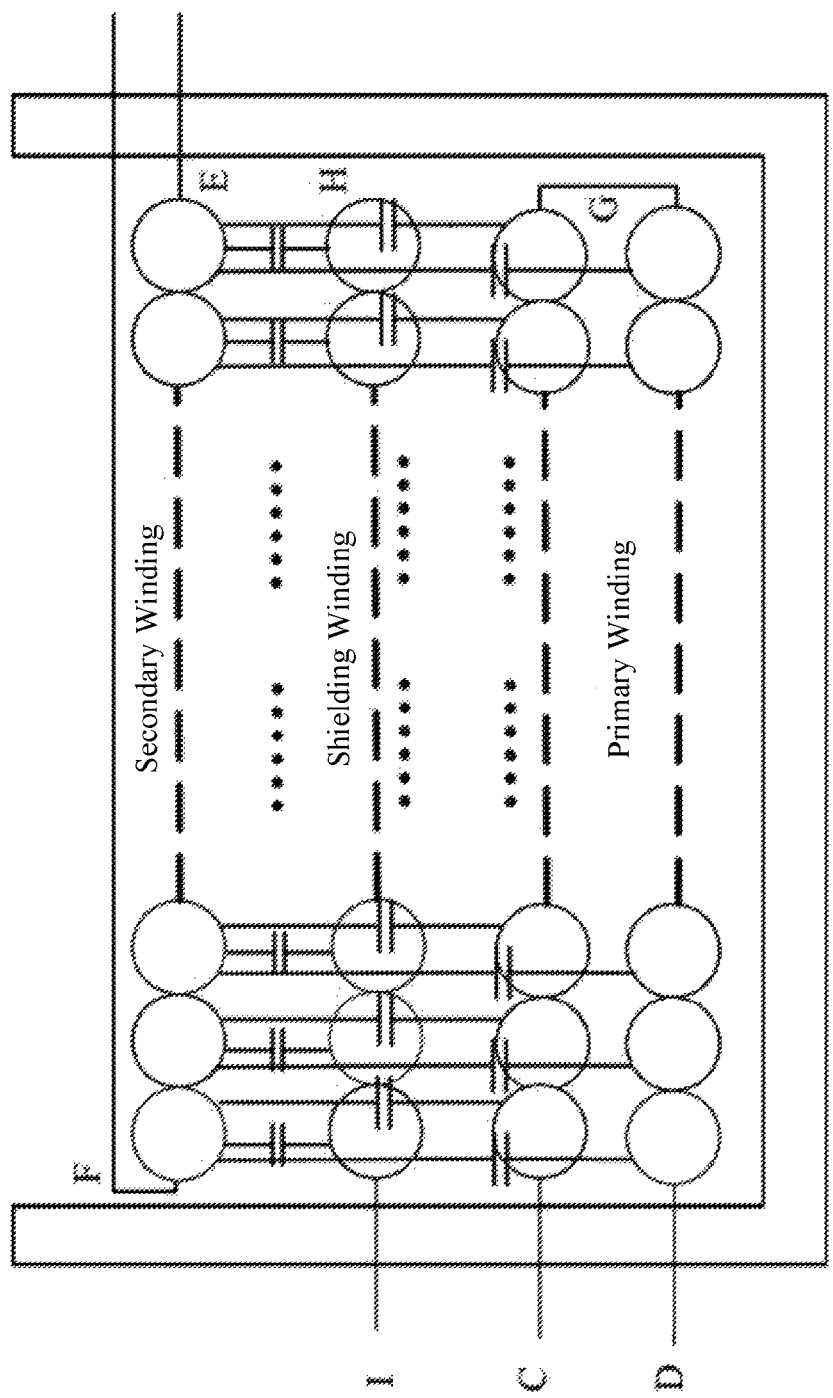
FIG. 2 (conventional)

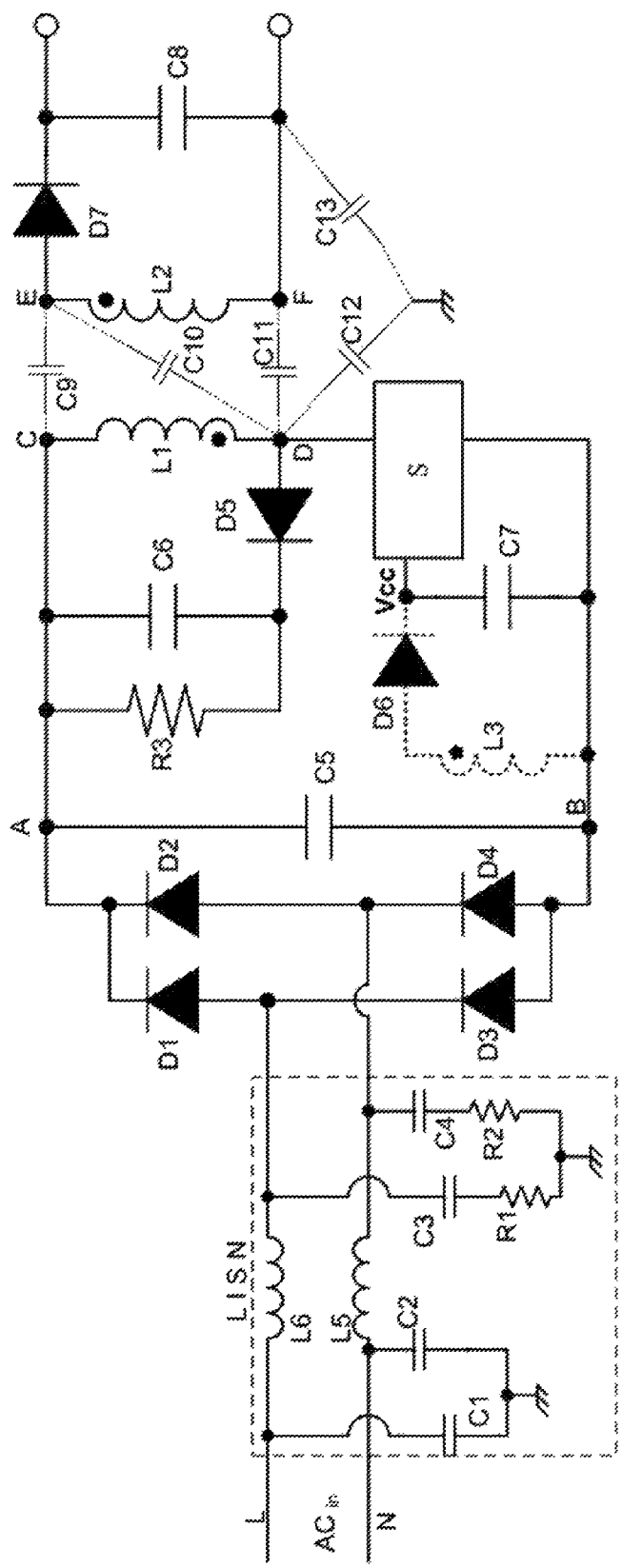
FIG. 3A (conventional)

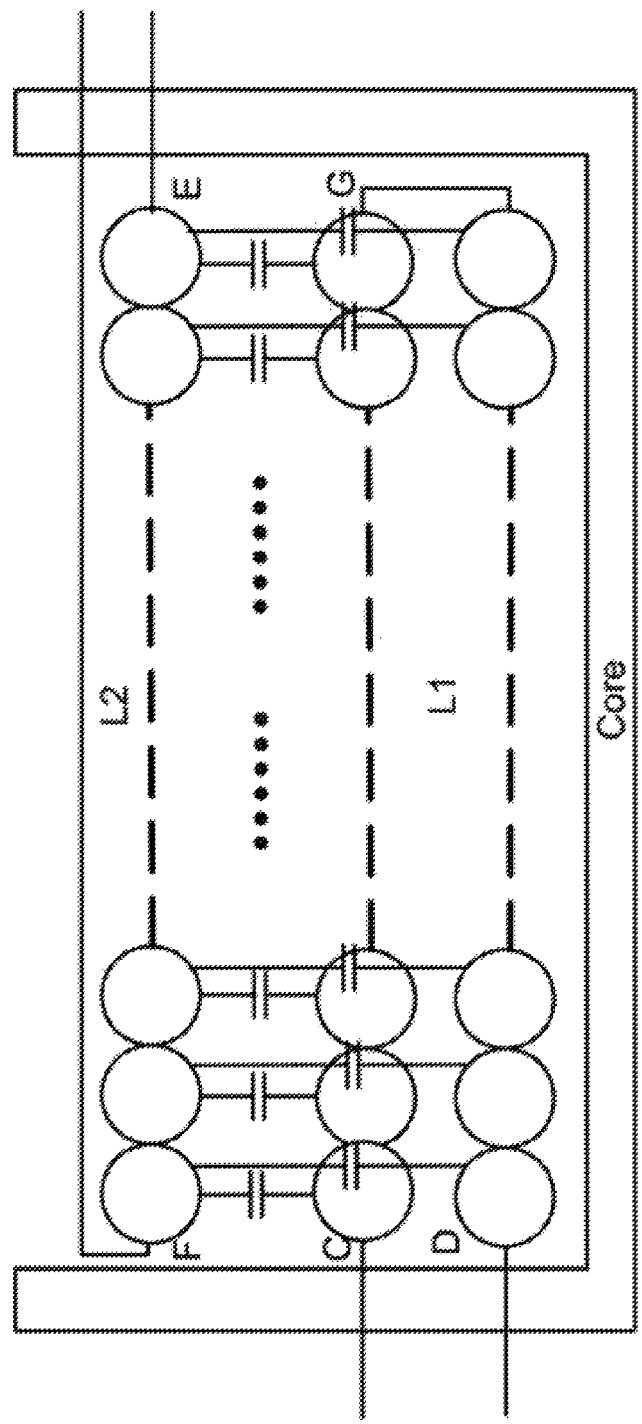
FIG. 3B (conventional)

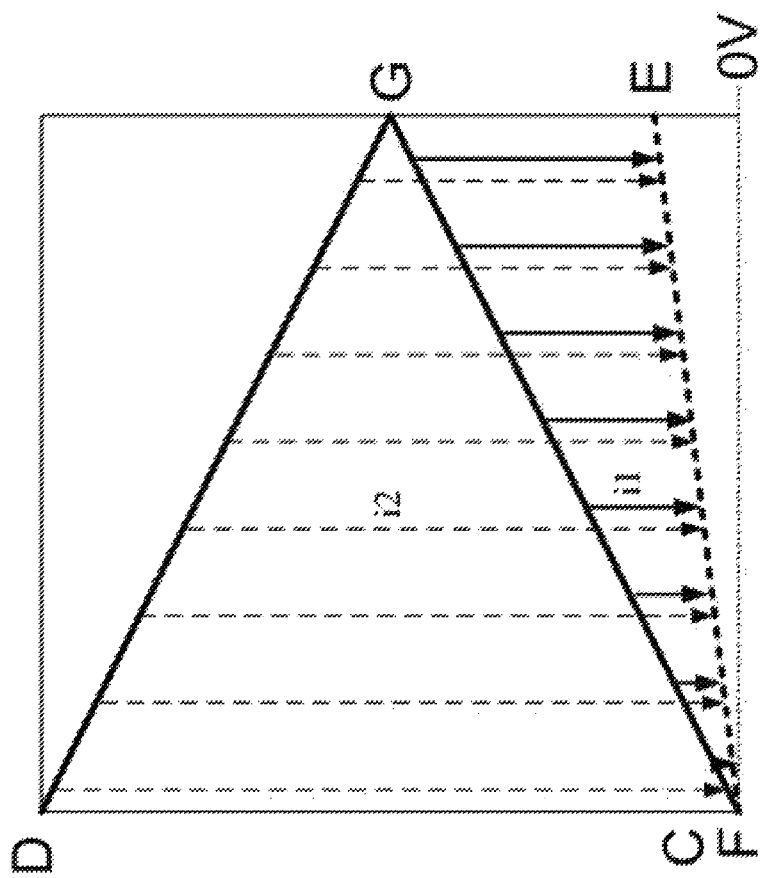
FIG. 3C (conventional)

TRANSFORMER, FLYBACK CONVERTER AND SWITCHING POWER SUPPLY WITH THE SAME

RELATED APPLICATIONS

This application claims the benefit of Chinese Patent Application No. 201510493392.4, filed on Aug. 12, 2015, which is incorporated herein by reference in its entirety.

FIELD OF THE INVENTION

The present invention generally relates to the field of power electronics, and more particularly to transformers, flyback converters, and switching power supplies.

BACKGROUND

Electromagnetic compatibility has been an important problem due to wide application of power converters with higher power density and smaller size. Current "jump" (e.g., transition, spike, etc.) and voltage jump can occur during the switching operation of a power switch in a power converter, and this may cause electromagnetic interference, harmonic interference, and/or strong electromagnetic radiation.

BRIEF DESCRIPTION OF THE DRAWINGS

FIG. 1 is a schematic block diagram of an example flyback converter with a Y-capacitor.

FIG. 2 is a sectional diagram of an example transformer provided with a shielding winding.

FIG. 3A is a schematic block diagram model for analyzing a common mode conducted current in a flyback converter.

FIG. 3B is a sectional diagram of an example transformer in the circuit model of FIG. 3A.

FIG. 3C is an equivalent diagram of an example voltage variation of the transformer in FIG. 3B.

DETAILED DESCRIPTION

Figure 4A:
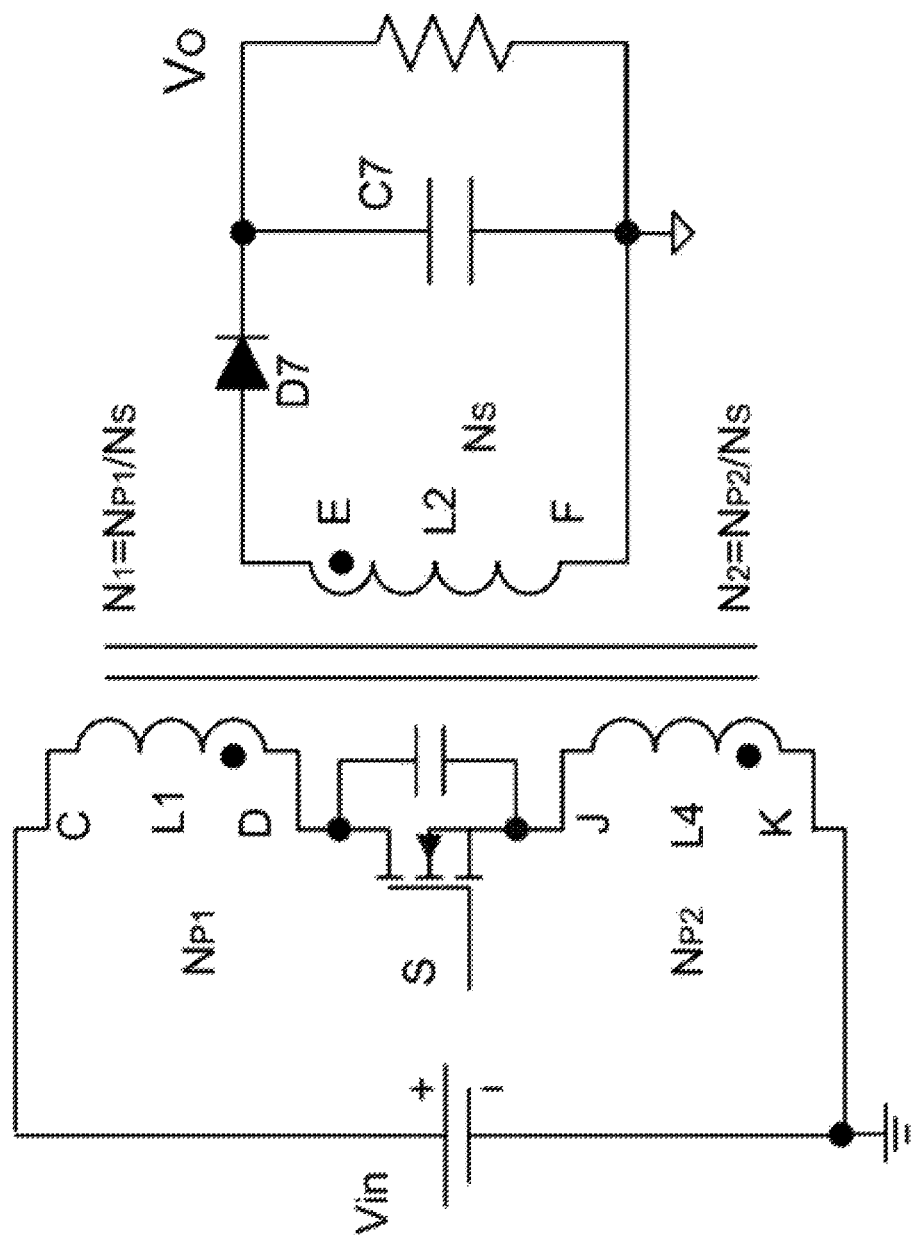
FIG. 4A is a schematic block diagram of an example flyback converter, in accordance with embodiments of the present invention.

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Conducted electromagnetic interference may show in a common mode (e.g., asymmetry) form and in a differential mode (e.g., symmetry) in the form of a voltage or a current. The internal mechanism of generating common mode (CM) conducted interference is different from differential mode (DM) conducted interference. Common mode interference can be generated in a loop through phase lines, parasitic capacitors to ground, and ground, and is mainly caused by high frequency oscillation on a parasitic capacitor due to the relatively high voltage jump. Differential mode interference may be generated between phase lines in a loop through phase lines and power supplies, and is mainly caused by pulse currents of electronic device. Traditionally, common mode conducted interference of electromagnetic interference (EMI) may be reduced by adding a Y-capacitor and/or by adding a shielding winding in a transformer.

Referring now to FIG. 1, shown is a schematic block diagram of an example flyback converter with a Y-capacitor. In this example, a flyback converters can apply a Y-capacitor between primary ground and secondary ground, in order to reduce a common mode current that results in EMI. Here, capacitors C9-C11 with two ends connected to dotted terminals are coupling capacitors between the primary side and the secondary side. The path through which the noise passes to the ground via the coupling capacitors between the primary side and the secondary side can be changed to the path through which the noise may be directly transferred from the secondary winding of the transformer to the secondary winding and back to point D because of the existence of Y-capacitor C14. Thus, the current flowing from the ground to the power supply through the phase lines can be reduced to further reduce EMI. However, Y-capacitors may not be applicable to circuits that are sensitive to leakage currents because Y-capacitors may have leakage currents.

Referring now to FIG. 2, shown is a sectional diagram of an example transformer provided with a shielding winding. In this example, a flyback converter can apply a shielding winding in the transformer in order to reduce the common mode current that results in EMI. The shielding winding can be configured between a primary winding and a secondary winding, to reduce the coupling capacitance therebetween, and to further reduce the common mode conducted current flowing from the primary winding to the secondary winding. However, the shielding winding may reduce the coupling coefficient between the primary winding and the secondary winding of the transformer due to the coupling capacitor between the shielding winding and the secondary winding. Thus, the conversion efficiency may be adversely affected. Moreover, the added shielding winding may reduce the effective fill factor of the transformer, and thus may not facilitate circuit miniaturization.

Referring now to FIG. 3A, shown is a schematic block diagram model for analyzing a common mode conducted current in a flyback converter. The flyback converter is analyzed at first to better introduce the source of a common mode current (i.e., conducted interference). In this example, a switching power supply may include flyback converter 1, a rectifier bridge that includes diodes D1-D4, and capacitor C5 connected to an input terminal of flyback converter 1. Flyback converter 1 may include primary winding L1, power switch S, secondary winding L2, and a rectifier and filter circuit that includes rectifier diode D7 and filter capacitor C8.

In some cases, flyback converter 1 may also include an RCD absorption circuit that can connect to two terminals of primary winding L1. The RCD absorption circuit may include a parallel circuit that includes resistor R3 and capacitor C6, and diode D5 connected between the parallel circuit and a dotted terminal of primary winding L1. In some cases, the flyback converter 1 may also include auxiliary winding L3 for controlling and/or supplying power, diode D6 (shown in dotted lines), and capacitor C7. To facilitate the analysis, a line impedance stabilization network (LISN) is provided at the AC power supply lines coupled to the rectifier bridge, for determining the value of the common mode current according to a current through LISN.

For the circuit model shown in FIG. 3A, the noise sources of the circuit may locate at terminal D of power switch S (e.g., the drain of a MOSFET), point E being coupled to an anode of diode D7, and a point being coupled to an anode of diode D6. Since those points are coupled to the switching device, interference may be introduced due to voltage jumps that occur when turning on and off the switching device. For the sake of clarity, circuits related to auxiliary winding L3 may not be taken in consideration in the analysis herein. Also, as there are flyback converters do not have auxiliary winding L3, the following analysis may be applicable to such flyback converters.

Because the voltage at the primary grounding terminal of the transformer and the ground voltage may only change at the power frequency, and the coupling capacitor between the primary grounding terminal and ground has a relatively large value, the primary grounding terminal and the ground may be at a stable voltage point relative to the switching frequency. Practically, the coupling capacitor between the secondary grounding terminal of the transformer and ground may also have a large value, and the secondary grounding terminal and ground can be at a stable voltage point. Thus, the voltage between the primary ground and the secondary ground of the transformer may be substantially constant. That is, the voltage between point C and point F can be considered constant.

In FIG. 3A, since voltage jump may rise at point D and point E, coupling capacitors C9-C11 between the primary winding and the secondary winding may form a current loop from primary winding L1 to secondary winding L2, to transmit the common mode conducted current. For live wire L, the common mode conducted interference loop may include the following. In loop 1, the current can flow from point D to ground through capacitor C12, and to a rectifier bridge through resistor R1 and capacitor C3. During the positive half cycle of input AC current $AC_{in}$, the current can flow to point A through diode D1, to point B through capacitor C5, and to point D through power switch S. During the negative half cycle of input AC current $AC_{in}$, the current can flow to point B through diode D3, to point A through capacitor C5, and to point D through primary winding L1.

In loop 2, the current can flow from point D to ground through capacitor C11, capacitor C13, or may flow to ground through capacitor C10, rectifier diode D7 and filter capacitor C8, and to the rectifier bridge through resistor R1 and capacitor C3. During the positive half cycle of input AC current $AC_{in}$, the current can flow to point A through diode D1, to point B through capacitor C5, and to point D through a power switch. During the negative half cycle of the input AC current $AC_{in}$, the current can flow to point B through diode D3, to point A through capacitor C5, and to point D through primary winding L1.

In loop 3, the current can flow from point E to ground through rectifier diode D7, filter capacitor C8 and capacitor C13, and to the rectifier bridge through resistor R1 and capacitor C3. During the positive half cycle of input AC current $AC_{in}$, the current can flow to point A through diode D1. During the negative half cycle of input AC current $AC_{in}$, the current can flow to point B through diode D3, to point A through capacitor C5. Finally, the current can flow from point A to point E through capacitor C9. The second and the third conducted interference loops as described above may pass the coupling capacitor between the primary side and the secondary side of the transformer, which are the currents that flow from the primary side to the secondary side. In a similar fashion, the common mode conducted interference loop of the neutral line N through can be obtained.

Referring now to FIG. 3B, shown is a sectional diagram of an example transformer in the circuit model of FIG. 3A. In this particular example, the transformer may include primary winding L1, secondary winding L2, and a magnetic core and a frame. The frame and the magnetic core may be formed integrally, for example. Terminal D of primary winding L1 and terminal E of secondary winding L2 may be dotted terminals. Between the primary winding and the secondary winding of the transformer, there are coupling capacitors, for example, C9, C10 and C11, shown in FIG. 3A. In order to simplify the model, we can suppose coupling capacitors only exist in the up-down direction between the windings of the transformer. As shown in FIG. 3B, coupling capacitors exist between terminals D, G of primary winding L1, and terminals F, E of secondary winding L2, and coupling capacitors can also exist between terminals C, G of primary winding L1, and terminals F, E of secondary winding (e.g., the primary winding in FIG. 3B may be wound in two layers).

The number of turns of each layer of primary winding L1 can be larger than that of secondary winding L2. When the voltage across the primary winding is changing, the magnetic flux in the magnetic core may also change. Accordingly, the voltage across the secondary winding may change, where the primary voltage variation is $$\Delta V_{pri} = -N_{pri} \cdot \frac{d\Phi}{dt},$$

and the secondary voltage variation is $$\Delta V_{sec} = -N_{sec} \cdot \frac{d\Phi}{dt}.$$

Here, $N_{pri}$ is the number of turns of the primary winding, $N_{sec}$ is the number of turns of the secondary winding, and φ is the magnetic flux. When power switch S switches to an off state from an on state, the voltage at point D can increase relative to point C, and the voltage at point E at the secondary side can increase relative to point F. the voltage variation at point E may be less than at point D because the number of turns of the secondary winding is far fewer than the number of turns of the primary winding.

Referring now to FIG. 3C, shown is an equivalent diagram of an example voltage variation of the transformer in FIG. 3B. In this particular example, the abscissa denotes the position of each point in the axial direction of the magnetic core, and the ordinate denotes the variation rate of voltage at each point when the power switch changes its operation state. In such a case, the voltage rise from terminal D to terminal G of the primary winding can be greater than the voltage rise from terminal F to terminal E of the secondary winding. Also, the voltage rise from terminal C to terminal G of the primary winding may also be larger than the voltage rise from terminal F to terminal E of the secondary winding. Thus, the coupling capacitors between the primary winding and the secondary winding can be charged, with the charging currents marked as i1 (shown by the solid arrow lines) and i2 (shown by the dashed arrow lines). Charging currents i1 and i2 are common conducted currents in the transformer flowing from primary winding L1 to secondary winding L2.

The common mode conducted current may be determined by the variation rate of the voltage across the coupling capacitor and the value of the capacitor according to the analysis described above, that is $$i = C \cdot \frac{dV}{dt}.$$

When power switch S switches to an on state from an off state, the voltage at point D can decrease relative to point C. Similarly, common conducted currents can be generated between the primary winding and the secondary winding. In particular embodiments, a flyback converter and a transformer can be provided based on generating the common mode conducted current in order to reduce the common mode conducted current.

In one embodiment, a flyback converter can include: (i) a power switch being controlled to be turned on and off to control a current through a primary side; (ii) a first primary winding coupled between an input terminal and a first terminal of the power switch, where a dotted terminal of the first primary winding is coupled to a first terminal of the power switch; (iii) a second primary winding coupled between a second terminal of the power switch and a primary grounding terminal, where a dotted terminal of the second primary winding is coupled to the primary grounding terminal; (iv) a secondary winding configured between the first primary winding and the second primary winding in a radial direction of a magnetic core, where the first primary winding, the second primary winding, and the secondary winding are wound around the magnetic core; and (v) a secondary rectifier and filter circuit coupled with the secondary winding, and being configured to generate a stable current/voltage.

In one embodiment, a transformer configured in a flyback converter, can include: (i) a first primary winding; (ii) a second primary winding; (iii) a secondary winding; and (iv) a magnetic core, where the first primary winding, the second primary winding, and the secondary winding are wound around the magnetic core, and where the secondary winding is configured between the first primary winding and the second primary winding in a radial direction of the magnetic core.

Referring now to FIG. 4A, shown is a schematic block diagram of an example flyback converter, in accordance with embodiments of the present invention. In this particular example, the flyback converter may include power switch S, primary winding L1, primary winding L4, secondary winding L2, and a secondary rectifier and filter circuit. Power switch S can be controlled to be turned on and off, so as to control a current at the primary side. Primary winding L1 can connect between point C and power switch S, and the dotted terminal of primary winding L1 can connect to the first terminal (e.g., point D) of the power switch. Primary winding L4 can connect between terminal J of the power switch and primary grounding terminal K, and the dotted terminal of primary winding L4 can connect to the primary grounding terminal K. The dotted terminal of secondary winding L2 can ensure that the magnetic flux in secondary winding L2 may have an opposite direction to the primary winding when the current is flowing through the secondary winding.

It should be understood that the "dotted" terminal means the terminals of those windings in one group (e.g., two or more than two windings) that have the same potential polarity at any time under the function of the same alternation magnetic flux. In FIG. 4A, the connection of primary winding L1 and primary winding L4 can ensure that primary windings L1 and L4 have the same magnetic flux direction when there is a current at the primary side. Also, secondary winding L2 may have a different magnetic flux direction from primary winding L1 and primary winding L4. The secondary rectifier and filter circuit can connect to secondary winding L2, in order to output a stable current/voltage.

For example, the secondary rectifier and filter circuit RF may include rectifier diode D7 and filter capacitor C8. The anode of rectifier diode D7 can connect to the dotted terminal (e.g., point E) of secondary winding L2. The cathode of rectifier diode D7 can connect to the output terminal such that the dotted terminal of the first primary winding is coupled to the first terminal of the power switch, and the dotted terminal of the second primary winding is coupled to primary grounding terminal K. Filter capacitor C8 can connect between the output terminal and secondary grounding terminal F.

Figure 4B:
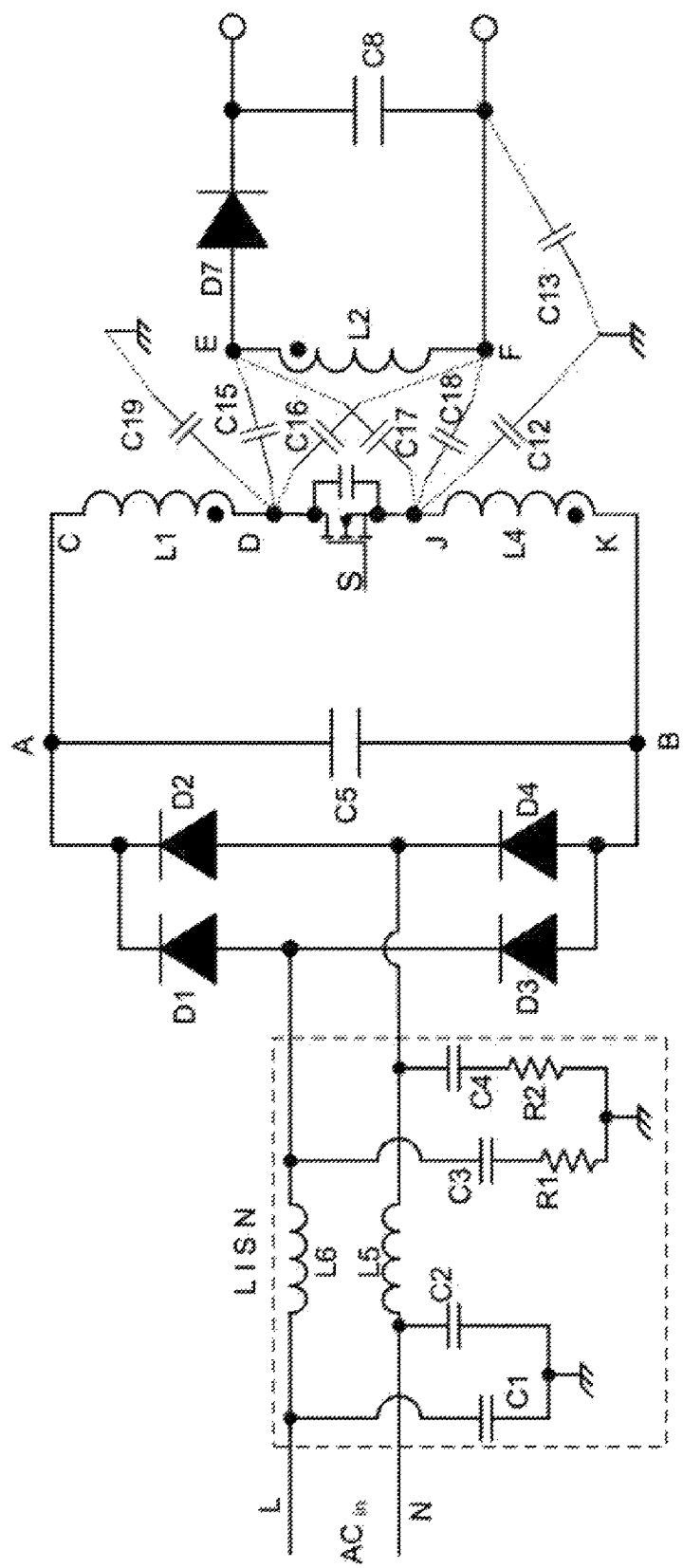
FIG. 4B is a schematic block diagram model of an example flyback converter, in accordance with embodiments of the present invention.

Referring now to FIG. 4B, shown is a schematic block diagram model of an example flyback converter, in accordance with embodiments of the present invention. In order to better analyze the path of the common mode conducted current, FIG. 4B also shows a rectifier bridge, a capacitor, and a line impedance stabilization network besides the flyback converter. The configuration and connection relationship of those circuits or components are similar to FIG. 3A, so they will not be described herein. It should be understood that an RCD absorption circuit is omitted in FIG. 4B to facilitate the analysis, but it can also be applied to the flyback converter of certain embodiments. It should also be understood that a flyback converter without an auxiliary winding is described as an example herein, but particular embodiments may also be applicable to a flyback converter with an auxiliary winding.

As shown in FIG. 4B, the noise sources of the flyback converter may locate at point D and point J being coupled to the first and second terminals of power switch S respectively, and at point E of the anode of rectifier diode D7 at the secondary side. Similar to FIG. 3A, voltages at points C, F and K may be stable. Terminal D of primary winding L1, terminal K of primary winding L4, and terminal E of secondary winding L2 are dotted terminals. Thus, the conduction loops of the common mode conducted currents of the live wire L can be analyzed as follows. In loop 1, the current can flow from point D to ground through capacitor C19, and to a rectifier bridge through resistor R1 and capacitor C3. During the positive half cycle of input AC current $AC_{in}$, the current can flow to A through diode D1. During the negative half cycle of input AC current $AC_{in}$, the current can flow to B through D3, and to A through C5. Finally, the current can flow from point A to point D through primary winding L1.

In loop 2, the current can flow from point D to a secondary grounding terminal through capacitor C15, rectifier diode D7 and filter capacitor C8, or to the secondary grounding terminal through capacitor C16, and to ground through capacitor C13, and further to the rectifier bridge through resistor R1 and capacitor C3. During the positive half cycle of input AC current the current can flow to point A through diode D1, to point B through capacitor C5. During the negative half cycle of input AC current $AC_{in}$, the current can flow to point B through the diode D3, to point A through capacitor C5. Finally, the current can flow from point A to point D through primary winding L1.

In loop 3, the current can flow from point J to ground through capacitor C12, and to the rectifier bridge through resistor R1 and capacitor C3. During the positive half cycle of input AC current $AC_{in}$, the current can flow to point A through diode D1, to point B through capacitor C5. During the negative half cycle of input AC current $AC_{in}$, the current can flow to point B through diode D3. Finally, the current can flow from point B to point J through primary winding L4.

In loop 4, the current can flow from point J to the secondary grounding terminal through capacitor C17, rectifier diode D7 and filter capacitor C8, or to the secondary grounding terminal through capacitor C18, and to ground through capacitor C13, and further to the rectifier bridge through resistor R1 and capacitor C3. During the positive half cycle of input AC current $AC_{in}$, the current can flow to point A through diode D1, to point B through capacitor C5. During the negative half cycle of input AC current $AC_{in}$, the current can flow to point B through diode D3. Finally, the current can flow from point B to point J through L4.

Similarly, neutral line N may also have four different conduction loops of common mode conducted currents. The currents in the second and fourth loops described above can both be conducted through the coupling capacitors between the primary winding and the secondary winding of the flyback converter. The displacement currents between the primary winding and the secondary winding can be cancelled out by changing the configuration and position of the windings, in order to reduce the common mode conducted current.

Figure 4C:
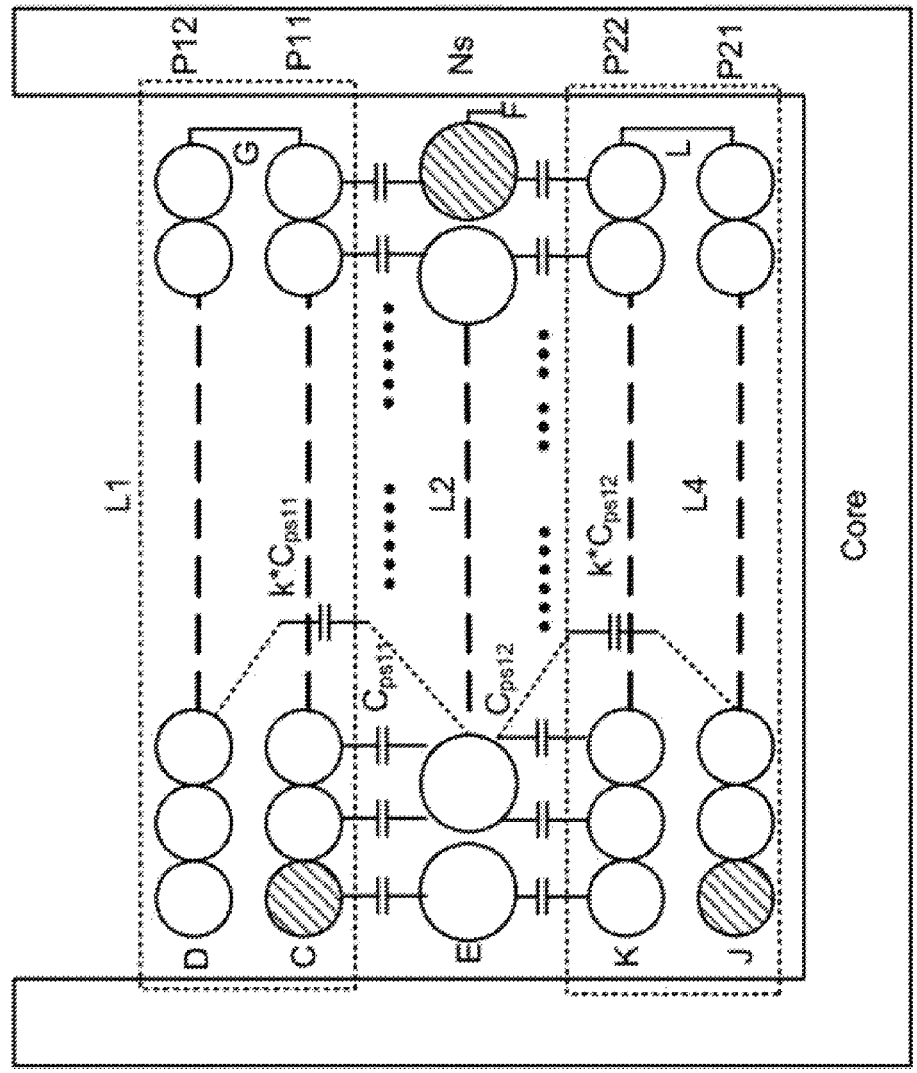
FIG. 4C is a sectional diagram of an example transformer in a flyback converter, in accordance with embodiments of the present invention.

Referring now to FIG. 4C, shown is a sectional diagram of an example transformer in a flyback converter, in accordance with embodiments of the present invention. In this particular example, primary winding L1, primary winding L4, and secondary winding L2 can be wound around the same magnetic core. Also, secondary winding L2 can be configured between primary winding L1 and primary winding L4 in the radial direction of the magnetic core.

In FIG. 4C, primary winding L1 and primary winding L4 can be wound by way of double layers. Primary winding L1 may include layer P11 from terminal C to terminal G, and layer P12 from terminal G to terminal D, and primary winding L2 may include layer P21 from terminal J to terminal L and layer P22 from terminal L to terminal K. Secondary winding L2 can be wound by way of single layer, which may include one layer from terminal E to terminal F. All of the terminals of the windings described above may correspond to the points in the circuit shown in FIG. 4B. It should be understood that the transformer of the flyback converter in this example can employ other winding approaches, such as all of the three windings being wound by way of single layer, or by way of multilayer, etc., and the number of layers of each winding may be the same or different according to practical requirements.

As shown in FIG. 4C, primary winding L1, secondary winding L2, and primary winding L4 can be configured in sequence from outside to inside in the radial direction of the magnetic core. It should be understood that the transformer of the flyback converter in this example can also have other configurations, such as primary winding L1, secondary winding L2, and primary winding L4 being configured in sequence from inside to outside in the radial direction of the magnetic core.

Between primary winding L1 and secondary winding L2 coupling capacitors may be included, where coupling capacitor $C_{ps11}$ (e.g., adjacent-layer capacitor) are relatively large and the coupling capacitor (e.g., interlayer capacitor) of the second layer (e.g., from terminal D to terminal G) is relatively small with a value equal to $k*C_{ps11}$ because the first layer (e.g., from terminal C to terminal G) is more close to the secondary winding, where k is a proportion factor between the interlayer capacitor and the adjacent-layer capacitor. Similarly, between primary winding L4 and secondary winding L2 coupling capacitors can be included. Coupling capacitor $C_{ps12}$ may be relatively large and the coupling capacitor of the first layer (e.g., from terminal J to terminal L) can be relatively small with a value equal to $k*C_{ps12}$, where k is a proportion factor between the interlayer capacitor and the adjacent-layer capacitor. In this example, to facilitate analysis, the proportion factors of primary winding L1 and primary winding L4 can be the same.

Figure 4D:
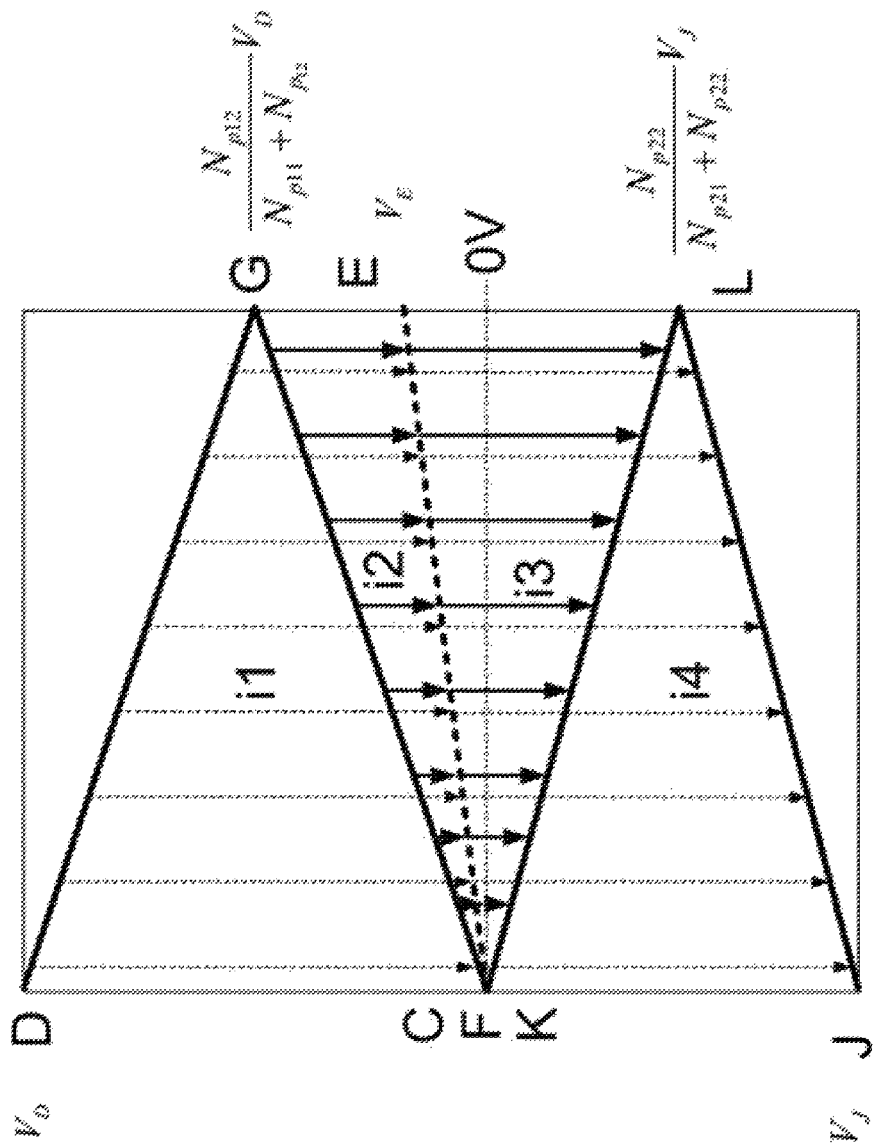
FIG. 4D is an equivalent diagram of an example voltage variation of a transformer, in accordance with embodiments of the present invention.

Referring now to FIG. 4D, shown is an equivalent diagram of an example voltage variation of a transformer, in accordance with embodiments of the present invention. In this example, when power switch S switches to an off state from an on state, the voltage at point D can increase relative to the voltage at point C. The voltage at point E may also increase relative to the voltage at point F, and the voltage at point J can decrease relative to the voltage at point K. As described above, the voltage variation may be zero because the voltages at points C, F and K are substantially stable. The voltage variation can be negative since the voltage at point J is decreased.

The coupling capacitor between primary winding L1 and secondary winding L2 can be charged because the voltage increase at point E of the secondary winding is small relative to point D, in order to generate a displacement current from primary winding L1 to secondary winding L2. In FIG. 4D, the charging current from the second layer (e.g., from terminal D to terminal G) of primary winding L1 to secondary winding L2 (e.g., from terminal F to terminal E) is i1, and the dashed arrow in FIG. 4d indicates the current direction. The charging current from the first layer (e.g., from terminal C to terminal G) of primary winding L1 to secondary winding L2 (e.g., from terminal F to terminal E) is i2, and the solid arrow in FIG. 4D indicates the current direction.

The coupling capacitor between primary winding L4 and secondary winding L2 can be charged in an inverse direction because the voltage at point E may increase while the voltages at points J and L can decrease, so as to generate a displacement current from secondary winding L2 to primary winding L4. In FIG. 4D, the charging current from the second layer (e.g., from terminal K to terminal L) of primary winding L4 to secondary winding L2 (from terminal F to terminal E) is i3, and the solid arrow in FIG. 4D indicates the current direction. The charging current from the second layer (e.g., from terminal J to terminal L) of primary winding L4 to secondary winding L2 (e.g., from terminal F to terminal E) is i4, and the dashed arrow in FIG. 4D indicates the current direction.

Thus, the first displacement current between primary winding L1 and secondary winding L2 can flow from the primary side to the secondary side, and the second displacement current between primary winding L4 and secondary winding L2 can flow from the secondary side to the primary side. After dividing the primary winding into two parts, and the first displacement current and the second displacement current may completely cancel out or partially cancel out each other, so as to reduce the common mode conducted current to optimize the EMI performance. Also for example, two displacement currents may be approximately equal by setting secondary winding L2 between primary winding L1 and primary winding L4, thus more displacement currents can be cancelled out in order to reduce the common mode conducted current to the maximum extent.

Also, the first displacement current may be equal to or approximately equal to the second displacement current by regulating turn ratio N1 of primary winding L1 and secondary winding L2, and turn ratio N2 of primary winding L4 and secondary winding L2, so as to cancel out the displacement currents to the maximum extent, and to minimize the common mode conducted current between the primary side and the secondary side. Specifically, the displacement currents can be determined by the variation rate of the voltages across the coupling capacitors and the value of the capacitors, that is i=C*dv/dt. The sum of currents i1 and i2 that flow from primary winding Np1 to secondary winding Ns may be relatively close (e.g., matches or substantially matches) to the sum of currents i3 and i4 that flow from secondary winding Ns to primary winding Np2. This can be a result of regulating the proportion between turn ratio Np1 of primary winding L1, and/or the value of the inductor and turn ratio Np2 of primary winding L4, and/or the value of the inductor, so as to significantly optimize the common mode conducted interference loops 2 and 4, to further optimize the EMI performance.

When power switch S is switched from an off state to an on state, the voltage at point D can decrease relative to point C. Similarly, the common mode conducted currents in the common mode conducted interference loops 2 and 4 can be significantly decreased to optimize the EMI performance. The following describes an example regulation method of turn ratios N1 and N2 by taking the transformer of FIG. 4C as an example. As mentioned above, both of primary winding L1 and primary winding L4 may include two layers, and the turn ratios are Np1 and Np2 respectively. Also, secondary winding L2 may include one layer with turn ratio of Ns.

The voltage variation $V_D$ at point D when the power switch changes its state from on to off is:

$$V_D = V_{in} * \frac{N_{P1}}{N_{P1} + N_{P2}} + N_1 * V_O,$$

where Vin is the input voltage (e.g., the voltage at point C), and Vo is the output voltage.

The voltage variation $V_J$ at point J when the power switch changes its state from on to off is:

$$V_J = -\left(V_{in} * \frac{N_{P2}}{N_{P1} + N_{P2}} + N_2 * V_O\right).$$

The voltage variation $V_E$ at point E when the power switch changes its state from on to off is:

$$V_E = V_O + \frac{V_{in}}{N_1 + N_2} = \frac{V_D}{N_1} = -\frac{V_J}{N_2}.$$

The time duration Δt when the switch turns to off from on can be determined, and common mode conducted current $I_{CM1}$ from primary winding L1 to secondary winding L2 may satisfy:

$$I_{CM1} = C_{ps11}\frac{N_{p12} - N_S}{2*N_{P1}*\Delta t}V_D + k*C_{ps11}\frac{N_{P1} + N_{p12} - N_S}{2*N_{P1}*\Delta t}V_D.$$

Here, $N_{p11}$ is the turn number of the first layer of primary winding L1, and $N_{p22}$ is the turn number of the second layer of primary winding L1.

The common mode conducted current ICM2 from second primary winding L4 to secondary winding L2 may satisfy:

$$I_{CM2} = C_{ps12}\frac{N_{p22} + N_S}{2*N_{P2}*\Delta t}V_J + k*_{ps12}\frac{N_{P2} + N_{p22} + N_S}{2*N_{P2}*\Delta t}V_J.$$

where $N_{p11}$ is the turn number of the first layer of primary winding L4, and $N_{p22}$ is the turn number of the second layer of primary winding L4.

In this example, if the air gap between primary winding L1 and secondary winding L2 is almost the same as the air gap between primary winding L4 and secondary winding L2, so $C_{ps11}=C_{ps12}=C_{ps}$.

Also, since the structures of the two layers of the primary windings are the same in this example, $N_{p11}=N_{p12}=0.5*N_{P1}$, $N_{p21}=N_{p22}=0.5*N_{P2}$.

When power switch S is switched from on to off, the common mode current ICM may satisfy:

$$I_{CM} = I_{CM1} + I_{CM2} = \frac{C_{ps}}{4*\Delta t}[(N_1 - N_2)(3k + 1) - 4(k + 1)]\left(\frac{V_{in}}{N_1 + N_2} + V_O\right).$$

From this formula, the following equation can be satisfied by setting the turn ratio of primary winding L1 and primary winding L4 when the transformer in FIG. 4C is applied in the flyback converter of FIG. 4A: $(N_1-N_2)(3k+1)-4(k+1)=0$.

Therefore, the common mode conducted current from the primary side to the secondary side may be zero in theory. Similarly, when the turn ratio satisfies the above equation, the common mode conducted current derived from the primary side to the secondary side may be zero in theory when power switch S is switched from an off state to an on state. Thus, by marking the turn ratio of primary winding L1 and secondary winding L2 to be turn ratio N1, and setting the turn ratio of primary winding L4 and secondary winding L2 to be turn ratio N2, the current that flows from the first primary winding to the secondary winding can be equal to the current that flows from the secondary winding to the second primary winding by setting a predetermined relationship between turn ratios N1 and N2. Also, the same result can be obtained by regulating the value of inductors.

It should be understood that, though the transformer as configured in FIG. 4C is described above, the conditions of the turn ratio or the inductor value can be derived which may make the common mode conducted current from the primary side to the secondary side be zero in theory when the transformer is in other configurations, such as where the conditions may vary along with the configuration of the transformer.

As shown in FIG. 4C, the non-dotted terminal of primary winding L1 and the dotted terminal of primary winding L4 can be adjacent to secondary winding L2 in the radial direction of the magnetic core. Because the non-dotted terminal C of primary winding L1 and dotted terminal K of primary winding L4 are voltage stable points in the circuit topology, the voltage variations at corresponding layers (e.g., from terminal C to terminal G and from terminal K to terminal L) may be relatively small. Since the coupling capacitor between secondary winding L2 and the adjacent layer is relatively large, the displacement current may be reduced by setting the layer with relatively small voltage variation to be close to secondary winding L2, and the layer with relatively large voltage variation to be far away from secondary winding L2, so as to optimize the EMI performance.

In particular embodiments a power switch can be arranged between a first primary winding (e.g., L1) and a second primary winding (e.g., L4) by dividing the primary winding into two such portions, and a secondary winding (e.g., L2) between the first and second primary windings in the radial direction of the magnetic core in the transformer. In this way, the current direction between the first primary winding and the secondary winding is opposite to the current direction between the second primary winding and the secondary winding, and thus the common mode current is reduced. As a result, the EMI performance can be optimized without using shielding windings and Y capacitors, and the fill factor and coupling efficiency of the transformer may be improved with fewer components.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A flyback converter, comprising:
 a) a power switch being controlled to be turned on and off to control a current through a primary side;
 b) a first primary winding coupled between an input terminal and a first terminal of said power switch, wherein a dotted terminal of said first primary winding is coupled to said first terminal of said power switch;
 c) a second primary winding coupled between a second terminal of said power switch and a primary grounding terminal, wherein a dotted terminal of said second primary winding is coupled to said primary grounding terminal, and wherein said second primary winding is directly connected to said power switch with no other devices therebetween;
 d) a secondary winding configured between said first primary winding and said second primary winding in a radial direction of a magnetic core, wherein said first primary winding, said second primary winding, and said secondary winding are wound around said magnetic core;
 e) a rectifier bridge directly connected to a non-dotted terminal of said first primary winding, and to said dotted terminal of said second primary winding;
 f) a capacitor coupled in parallel with said rectifier bridge, wherein said non-dotted terminal of said first primary winding is only connected to said rectifier bridge and said capacitor; and
 g) a secondary rectifier and filter circuit coupled with said secondary winding, and being configured to generate a stable current/voltage.

2. The flyback converter of claim 1, wherein:
 a) said first primary winding and said secondary winding have a first turn ratio;
 b) said second primary winding and said secondary winding have a second turn ratio; and
 c) a displacement current from said first primary winding to said secondary winding is equal to a displacement current from said secondary winding to said second primary winding when said first turn ratio and said second turn ratio have a predetermined relationship.

3. The flyback converter of claim 1, wherein:
 a) said first primary winding has a first inductance value;
 b) said second primary winding has a second inductance value; and
 c) a displacement current from said first primary winding to said secondary winding is equal to a displacement current from said secondary winding to said second primary winding when said first and second inductance values have a predetermined relationship.

4. The flyback converter of claim 1, wherein said secondary rectifier and filter circuit comprises:
 a) a rectifier diode having an anode coupled to a dotted terminal of said secondary winding, and a cathode coupled to an output terminal; and
 b) a filter capacitor coupled between said output terminal and a secondary grounding terminal.

5. The flyback converter of claim 1, wherein said first primary winding, said secondary winding, and said second primary winding are configured from inside to outside in said radial direction of said magnetic core.

6. The flyback converter of claim 1, wherein said first primary winding, said secondary winding, and said second primary winding are configured from outside to inside in said radial direction of said magnetic core.

7. The flyback converter of claim 1, wherein said non-dotted terminal of said first primary winding, and said dotted terminal of said second primary winding are configured adjacent to said secondary winding in said radial direction of said magnetic core.

8. The flyback converter of claim 1, wherein said capacitor is directly connected to said first and second primary windings.

* * * * *